(12) United States Patent
Reingruber et al.

(10) Patent No.: US 9,863,628 B2
(45) Date of Patent: Jan. 9, 2018

(54) SEMICONDUCTOR RETROFIT LAMP HAVING CONNECTING ELEMENTS ARRANGED ON TWO SIDES

(71) Applicant: OSRAM GmbH, Munich (DE)

(72) Inventors: Fabian Reingruber, Munich (DE); Carolin Muehlbauer, Regenstauf (DE); Markus Hofmann, Bad Abbach (DE)

(73) Assignee: LEDVANCE GmbH (DE)

( * ) Notice: Subject to any disclaimer, the term of this patent is extended or adjusted under 35 U.S.C. 154(b) by 52 days.

(21) Appl. No.: 14/399,164

(22) PCT Filed: Apr. 29, 2013

(86) PCT No.: PCT/EP2013/058924
§ 371 (c)(1),
(2) Date: Nov. 6, 2014

(87) PCT Pub. No.: WO2013/167419
PCT Pub. Date: Nov. 14, 2013

(65) Prior Publication Data
US 2015/0124443 A1    May 7, 2015

(30) Foreign Application Priority Data

May 8, 2012    (DE) .................. 10 2012 207 608

(51) Int. Cl.
*F21K 99/00*    (2016.01)
*F21V 23/00*    (2015.01)
(Continued)

(52) U.S. Cl.
CPC ................ *F21V 29/83* (2015.01); *F21K 9/27* (2016.08); *F21K 9/278* (2016.08); *F21K 9/90* (2013.01);
(Continued)

(58) Field of Classification Search
CPC .......... F21K 9/17; F21V 29/83; F21Y 2103/10
USPC .................................................. 362/218, 219
See application file for complete search history.

(56) References Cited

U.S. PATENT DOCUMENTS 7,594,738 B1 * 9/2009 Lin ...................... F21V 23/006
362/218
8,220,976 B2 * 7/2012 Liu ........................... F21K 9/00
362/218
(Continued)

FOREIGN PATENT DOCUMENTS

AT          10996 U2      2/2010
CN       101839413 A      9/2010
(Continued)

OTHER PUBLICATIONS

International Search Report of PCT/EP2013/058924 dated Jun. 17, 2013.
(Continued)

*Primary Examiner* — Andrew Coughlin
*Assistant Examiner* — Eric T Eide
(74) *Attorney, Agent, or Firm* — Hayes Soloway PC (57) ABSTRACT

Various embodiments may relate to a semiconductor retrofit bulb, in particular a retrofit festoon bulb, having connecting elements that are arranged on two sides. The semiconductor retrofit bulb may include at least a tubular cooling body having at least one outer face support surface, wherein there is arranged on the support surface at least one semiconductor light source, in particular a light diode, a driver housing that is introduced into a hollow space of the tubular cooling body. At least one flow channel is provided between the driver housing and the cooling body.

19 Claims, 6 Drawing Sheets

(51) Int. Cl.

| | |
|---|---|
| *F21V 29/83* | (2015.01) |
| *F21V 29/70* | (2015.01) |
| *F21V 29/00* | (2015.01) |
| *F21V 29/507* | (2015.01) |
| *F21K 9/90* | (2016.01) |
| *F21K 9/27* | (2016.01) |
| *F21K 9/278* | (2016.01) |
| *F21V 17/16* | (2006.01) |
| *F21Y 103/10* | (2016.01) |
| *F21Y 115/10* | (2016.01) |
| *F21V 29/89* | (2015.01) |

(52) U.S. Cl.
CPC .......... *F21V 23/009* (2013.01); *F21V 29/004* (2013.01); *F21V 29/507* (2015.01); *F21V 29/70* (2015.01); *F21V 17/164* (2013.01); *F21V 29/89* (2015.01); *F21Y 2103/10* (2016.08); *F21Y 2115/10* (2016.08); *Y02B 20/383* (2013.01); *Y10T 29/41* (2015.01)

(56) References Cited

U.S. PATENT DOCUMENTS

| | | |
|---|---|---|
| 8,251,541 B2 | 8/2012 | Lin |
| 2010/0253226 A1 | 10/2010 | Oki |
| 2011/0149563 A1 | 6/2011 | Hsia et al. |
| 2011/0176297 A1 | 7/2011 | Hsia et al. |
| 2011/0176298 A1 | 7/2011 | Meurer et al. |
| 2011/0292647 A1 | 12/2011 | Chang |
| 2012/0262061 A1* | 10/2012 | Lai ........................ F21V 23/006 315/35 |
| 2014/0286004 A1* | 9/2014 | Su ............................ F21K 9/17 362/218 |
| 2014/0313711 A1* | 10/2014 | Hwu ...................... F21V 23/00 362/218 |
| 2015/0043203 A1* | 2/2015 | Bengtsson ............ F21V 29/004 362/218 |

FOREIGN PATENT DOCUMENTS

| | | |
|---|---|---|
| DE | 202006007819 U1 | 8/2006 |
| DE | 202010013037 U1 | 2/2011 |
| DE | 102010006857 A1 | 7/2011 |
| EP | 2239493 A2 | 10/2010 |
| WO | 2007131882 A2 | 11/2007 |

OTHER PUBLICATIONS

German Office Action dated Jun. 17, 2013 issued in the corresponding German Application WO 2013/167419.

* cited by examiner

SEMICONDUCTOR RETROFIT LAMP HAVING CONNECTING ELEMENTS ARRANGED ON TWO SIDES

RELATED APPLICATIONS

The present application is a national stage entry according to 35 U.S.C. §371 of PCT application No.: PCT/EP2013/058924 filed on Apr. 29, 2013, which claims priority from German application No.: 10 2012 207 608.5 filed on May 8, 2012, and is incorporated herein by reference in its entirety.

TECHNICAL FIELD

Various embodiments generally relate to a semiconductor retrofit bulb having connecting elements arranged on two sides and at least one semiconductor light source. Various embodiments relate moreover to a method for producing a semiconductor retrofit bulb of this type. It is particularly preferred that the present disclosure may be used for replacing a festoon bulb by an LED retrofit bulb. The retrofit festoon bulb may be used in a particularly advantageous manner in the field of building site lamps, ceiling lights, ship's lamps and motor vehicle lights.

BACKGROUND

LED retrofit festoon bulbs are known that include a rigid circuit board that is equipped with multiple light diodes (LEDs). In each case, a festoon bulb contact is attached to the circuit board at two opposite lying ends. The circuit board can be surrounded for protection purposes by a transparent tube, wherein the tube is held at the end side by the festoon contacts. A driver is provided either on the circuit board or is accommodated in one of the festoon contacts. In the case of these LED retrofit festoon lamps, the problem arises that heat generated by the LEDs can only be discharged in a less than effective manner and as a result the output of the LEDs is limited.

SUMMARY

Various embodiments provide a semiconductor retrofit bulb, in particular a retrofit festoon bulb, which renders it possible to improve the dissipation of heat.

Various embodiments provide a semiconductor retrofit bulb having connecting elements arranged on two sides, wherein the semiconductor retrofit bulb includes at least one tubular cooling body having at least one outer face support surface, wherein at least one semiconductor light source is arranged on the support surface, and a driver housing is introduced into a hollow space of the tubular cooling body, wherein at least one flow channel is provided between the driver housing and the cooling body.

This arrangement includes the advantage that by providing the cooling body it is possible to improve the heat dissipation from the semiconductor retrofit bulb. The flow channel renders possible in particular an ("inner") air flow between the cooling body and the driver housing along a longitudinal extension of the cooling body and consequently also along an inner face of the cooling body. A cooling body cooling surface that has been enlarged in this manner further improves a cooling capacity. In addition, the inner air flow also renders possible an effective cooling of the driver housing and consequently dissipation of heat from a driver that is provided in the driver housing. The improved heat dissipation in turn renders it possible to use semiconductor light sources that have a greater output. This is supported by means of the spacing at least of one part of the driver housing from the cooling body, as a consequence of which the driver is thermally decoupled from the at least one semiconductor light source.

It is preferred that the at least one semiconductor light source includes at least one light diode. If multiple light diodes are provided, said light diodes may illuminate either in the same color or in different colors. A color may be monochrome (for example red, green, blue etc.) or multichrome (for example white). Also, the light that is radiated from the at least one light diode may be an infrared light (IR-LED) or an ultraviolet light (UV-LED). Multiple light diodes may generate a mixed light; for example a white mixed light. The at least one light diode may include at least one wave length-changing fluorescent substance (conversion-LED). The fluorescent substance may be arranged alternatively or in addition remotely from the light diode ("remote phosphor"). The at least one light diode may be provided in the form at least of one individually housed light diode or in the form of at least one LED chip. Multiple LED chips may be mounted on a common substrate ("submount"). The at least one light diode may be equipped with at least one dedicated and/or common lens for beam guidance, for example at least one Fresnel lens, collimator, etc. In lieu of or in addition to inorganic light diodes, for example on the basis of InGaN or AlInGaP, it is generally also possible to use organic LEDs (OLEDs, for example polymer OLEDs). Alternatively, the at least one semiconductor light source may include for example at least one diode laser.

The semiconductor retrofit bulb may be equipped in particular as a (semiconductor) retrofit festoon bulb. The term 'festoon bulb' may be generally understood to mean a tubular electric lighting means whose two contacts are attached to the two opposite lying ends. In this case, the connecting elements are preferably embodied as bases or contacts of the R7 type, in particular R7s. The semiconductor retrofit bulb may be used in particular for replacing halogen festoon bulbs.

Alternatively, the semiconductor retrofit bulb may be a retrofit fluorescent bulb or a retrofit linear bulb.

In one embodiment, the driver housing is held by the cooling body by way of connecting pieces in a press fit or force-fitting manner. The press fit arrangement renders it possible to assemble the semiconductor retrofit bulb in a simple manner, for example by means of inserting the driver housing into the cooling body. The press fit arrangement also renders it possible to hold the driver housing in a sufficiently secure manner in the cooling body, in particular also without further fastening means, such as adhesive, screws, latches, etc. (even if these may be used as an option). Moreover, the connecting pieces render it possible to provide a precise and sufficiently large spacing between the carrier housing and the cooling body in a simple manner. The connecting pieces include a comparatively small cross sectional area in the flow direction of the air and consequently only slightly hinder the air flow. Also, heat transfer is kept particularly small between the cooling body or rather the semiconductor light sources on the one hand and the driver housing or rather the driver on the other hand by virtue of the connecting pieces.

In one development, the driver housing is embodied from a synthetic material. This renders possible a cost-effective and geometrically flexible production process whilst maintaining good electrical insulation.

In a further embodiment, the driver housing includes multiple parts and is held together by means of the press fit arrangement. It is thus possible to insert a driver in a simple manner in one part of the driver housing, said part of the driver housing being closed by means of being covered by another part and the closed driver housing may be inserted into the cooling body. The parts of the driver housing are held together by means of the press fit arrangement. The parts of the driver housing do not need also to be fastened one to the other by means of additional means (loose covers), but they may be as an option. Thus, it is possible in order to provide an additional fastening, for example to produce a greater magnitude of leak tightness, for the parts to be additionally screwed or adhered one to the other. The loose covering arrangement may include a clamping fit or a press fit arrangement of the parts of the driver housing and/or a latching arrangement. The loose covering arrangement may even include a loose covering of the parts of the driver housing. The parts of the multi-part driver housing may be manufactured in particular without an undercut which considerably facilitates production using a molding method, for example a synthetic material injection molding method.

In one embodiment, the driver housing is embodied in two parts and in particular includes a lower part and an upper part.

In a further embodiment, parts of the driver housing that have been assembled together overlap one another, in particular at their supporting edges. It is thus possible, if necessary, to extend safety gaps (for example air and leakage paths) from an outer face of the driver housing to a driver that is received in the driver housing. In addition, this facilitates the said parts being positioned with respect to one another in a precise manner using mechanical means.

In a further embodiment, the driver housing may be inserted into the cooling body. It is thus possible to achieve a particularly simple assembly process.

In addition, in one embodiment, the cooling body includes an open circular profile that has inwardly curved free ends. A profile of this type may be produced in a particularly simple manner, in particular by means of bending a metal sheet or extrusion molding. In one development, at least some of the connecting pieces engage in the inwardly curved free ends. This embodiment prevents the cooling body from being pulled on when the driver housing is inserted.

There is also one embodiment in which the cooling body is a bent sheet metal part or a metal extrusion molded part. The cooling body may in particular in general be a sheet metal part.

In a further development, the driver housing includes an elongated form and in particular has a longer length than the cooling body. As a consequence, easier access is provided to the end sides of the driver housing and in addition it is easier to insert in said driver housing, it being possible for said end sides to include for example the connecting elements.

In a further embodiment, the driver housing includes a base form in particular an outer contour that has a rectangular profile. The cooling body may include a base form in particular an outer contour that has for example a circular, oval, rectangular or free-formed cross section. However, the profile forms or cross sectional forms of the cooling body and the driver housing are fundamentally not limited.

It is possible to provide one or multiple connecting elements on one side. The one or multiple connecting elements may include the form of a conventional connecting base. The connecting elements represent at least one mechanical connecting option for holding the semiconductor retrofit bulb in a bulb holder. It is not necessary for the two sides also to provide an electrical connecting option, it is possible by way of example to achieve an electrical connecting option on one side, for example with two electrical contacts, for example contact pins. The at least one connecting element on one side may therefore include one or multiple electric contacts or may not include an electrical contact.

In one embodiment, the driver housing includes at the end side connecting elements that protrude at least in part, in particular entirely beyond the cooling body. The semiconductor retrofit bulb is consequently held by means of the driver housing so that no mechanical loading is transmitted to the cooling body or to the semiconductor light sources or their carrier. This increases a serviceable life and supports a precise emission of light.

In a still further embodiment, at least one connecting element includes an electrically conductive contact element that is inserted between two parts of the driver housing, for example an upper part and a lower part. This simplifies the process of assembling the driver housing. The electrically conductive contact element may by way of example include an electrically conductive, in particular metal, sleeve and/or an electrically conductive, in particular metal, contact pin. However, it is fundamentally possible to use any base for a bulb that is equipped with connecting elements that are arranged at two sides. Thus, the connecting element for a semiconductor retrofit festoon bulb may be embodied as a base of the R7 type or R7s. The electrically conductive contact element may be held in particular by means of the two housing parts in a force-fitting manner and/or in a form-locking manner.

In a further embodiment, the cooling body includes at the end a receiving recess for inserting a cable duct that protrudes from the driver housing. The receiving recess represents a stop for the cable duct and renders it possible in conjunction with the cable duct firstly to position the driver housing in a precise manner relative to the cooling body and secondly to provide protection against the driver housing rotating. By virtue of the fact that said cable duct protrudes upwards, it is possible in addition to maintain the safety gaps with respect to the flow-guiding components and for example to prevent contact with electrical lines that are routed through the cable duct. The term "cable duct" may be understood to mean in particular any lead through that passes through the driver housing, in other words between an outer face and an inner space of the driver housing, and that is suitable and/or provided for the purpose of producing an electrical connection to the driver.

In one development, the at least one semiconductor light source includes multiple semiconductor light sources that are arranged on a common carrier, in particular a circuit board.

In one development, at least one semiconductor light source is arranged on a carrier. In a particular development, multiple semiconductor light sources are arranged on a common carrier. The semiconductor retrofit lamp may in other words include at least one carrier that is equipped in each case with at least one semiconductor light source. The carrier may by way of example be a circuit board, in particular a metal core board, a FR4 board, a ceramic board or a polyimide board. The carrier may be a rigid or a mechanically flexible carrier. The at least one carrier may be equipped in particular on its front face with at least one semiconductor light source and may lie with its rear face on the cooling body. The carrier may be fastened in particular by way of a thermal interface material (TIM) on the cooling body in order to render possible an efficient transfer of heat from the carrier to the cooling body and where applicable to provide an electrical insulation.

In a further embodiment, at least one outer face support surface includes a strip-shaped base form and is provided with semiconductor light sources that are arranged in a row. The term "semiconductor light strip" may be understood to mean in particular a strip-shaped carrier that is equipped with semiconductor light sources that are arranged in a row. The strip-shaped base form facilitates a process of producing a light radiation pattern that is similar to that of an elongated bulb that is to be replaced.

In one development, the semiconductor retrofit bulb includes at least one diffusor that is optically connected downstream of at least one semiconductor light source. In one embodiment, an outer face support surface is covered by a diffusor. The diffusor renders it possible in particular to achieve a more uniform radiation of light with respect to brightness and/or color. The diffusor may also include a beam-shaped in particular imaging, optical characteristic, for example by means of integrating at least one lens-type region. The diffusor may therefore also be used as a lens.

In general, in one development, the semiconductor retrofit bulb includes at least one cover that covers the at least one semiconductor light source for the purpose of protecting said semiconductor light source. The cover may be by way of example transparent. The cover may also be the diffusor and may be light permeable in a diffuse or light-scattering manner. Also, the cover may include a beam-forming, in particular imaging, optical characteristic, for example by means of integrating at least one lens-type region.

In a further embodiment, a carrier that is equipped with at least one semiconductor light source lies on the support surface and the diffusor covers the carrier on the support surface. This renders it possible to fix the carrier on the cooling body in such a manner that the fixing arrangement is stable over a long period of time and is not sensitive to shocks or vibrations. In addition, the transfer of heat between the carrier and the cooling body is improved.

The cover, in particular the diffusor, may be latched with the cooling body or with the driver housing in order to provide a simple and secure fastening arrangement, and for this purpose may include by way of example at least one latching or snap hook. Thus, it is possible to fix in an axial manner the cooling body and the driver housing.

For the case where the cooling body includes at the end the receiving recess for the purpose of inserting the cable duct that is protruding from the driver housing, one development provides that the cover, in particular the diffusor, closes the receiving recess in the cable duct. Thus, it is possible for the case where the cover is latched with the cooling body that the cable duct is prevented from sliding out of the receiving recess and the driver housing is axially fixed and secured in the cooling body. This may also be achieved in the case of the cover being latched with the driver housing since in this manner the cover is used as a stop for the cooling body. For this purpose, the cover may cover in particular also a cable duct or another protruding protrusion of the driver housing, the covering arrangement being provided in particular also laterally in the direction of movement of the driver housing with respect to the cooling body.

One preferred development for rendering possible a transverse through-flow and consequently improved cooling of the semiconductor retrofit bulb provides that the cooling body includes in its peripherals surface cut-outs, for example cooling slots or cooling holes. It is preferred for the same purpose that in the presence of connecting pieces said connecting pieces are not embodied continuously over the longitudinal extension of the driver, but rather for example are provided in the form of connecting piece sections that are spaced apart from one another and are arranged in a row with respect to the longitudinal extension. The connecting piece sections may also be offset with respect to one another in the circumferential direction of the driver housing. The connecting piece sections may be for example elongated or pin-shaped.

The cooling body may include in general one or multiple cooling structures, for example cooling slots, cooling ribs, cooling blades, cooling pins, etc.

Various embodiments further provide a method for producing a semiconductor retrofit bulb, wherein the method includes at least the following steps: providing a tubular cooling body that is equipped with at least with one semiconductor light source and inserting a driver housing into a hollow space of the cooling body, said hollow space holding the driver housing in a press fit manner so that at least one flow channel is provided between the driver housing and the cooling body. This method provides the identical advantages as the above described semiconductor retrofit bulb and may be embodied in a similar manner.

In one embodiment by way of example, the driver housing includes multiple parts and prior to the step of inserting the driver housing the following steps are performed: inserting a driver into one part of the driver housing; and loosely covering this part of the driver housing with another part of the driver housing, and the step of inserting the driver housing includes inserting the loosely covered driver housing into the hollow space of the cooling body, said hollow space holding the driver housing in a press fit manner.

In particular, it is possible to perform the following production sequence:
(a) Provide a tubular cooling body that is equipped with at least one semiconductor light source;
(b) Insert a driver into a first part (in particular lower part) of a driver housing;
(c) Insert at least one electrical contact element in at least one connecting element of the first part;
(d) Loosely cover the first part of the driver housing with a second part (in particular upper part or cover) of the driver housing;
(e) Insert the driver housing in a hollow space of the cooling body until a protruding cable duct of the driver housing is received in a receiving recess of the cooling body;
(f) Fasten, in particular latch on, a cover, in particular a diffusor, on the at least one semiconductor light source so that the cover fixes the cooling body to the driver housing.

In step e), the insertion process may include inserting the driver housing into a hollow space of the cooling body until a protruding cable duct of the driver housing is received in a receiving recess of the cooling body. However, this is not essential and the cable duct may be arranged by way of example on the outer face on the cooling body, in particular abutting against the cooling body, in particular if the cover is fastened to the driver housing.

In step f), the fastening process may include in particular latching a cover, in particular a diffusor, over the at least one semiconductor light source so that the covering arrangement locks the receiving recess to the cable duct that is inserted therein.

This production sequence may be performed in a particular simple and cost-effective manner.

The production sequence may also include one or multiple steps for providing an electrical connection or contact, for example soldering an electrical connection, routing electrical lines etc.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
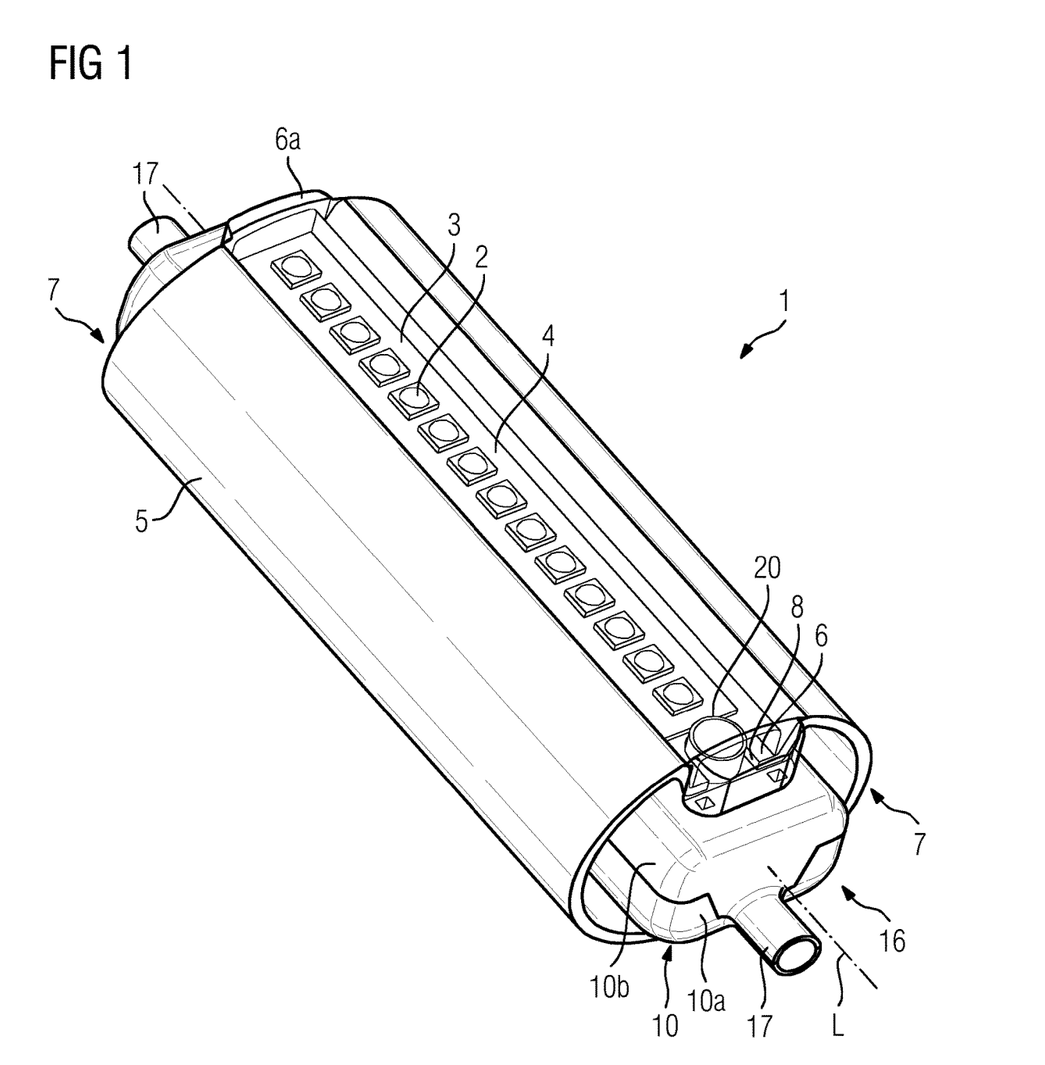
FIG. 1 illustrates an oblique view from above of an LED retrofit festoon bulb in accordance with a first embodiment.

FIG. 1 illustrates an oblique view from above of a semiconductor retrofit bulb in the form of an LED retrofit festoon bulb, in other words of a bulb that is equipped with multiple light diodes 2 as semiconductor light sources and said bulb being a replacement for a conventional festoon bulb.

The light diodes 2 are arranged in a row on a front face 3 of a strip-shaped carrier 4 in the form of a circuit board and said light diodes form together a semiconductor light strip in the form of an LED strip 2, 4. The carrier 4 of the LED strip 2, 4 lies with its rear face on an outer face of an open tubular cooling body 5 and in fact on an outer face support surface 6 that is embodied as a strip-shaped recess. By reason of the recess design, it is possible to position the carrier 4 precisely on the support surface 6. The carrier 4 of the LED strip 2, 4 may lie on the support surface 6 for the purpose of effectively transmitting heat, for example by way of a TIM.

The support surface 6 and consequently the light diodes 2 are covered by an elongated diffusor 6a that is light permeable in a diffuse manner and extends the entire length of the cooling body 5. The diffusor 6a latches with the cooling body 5.

Figure 2:
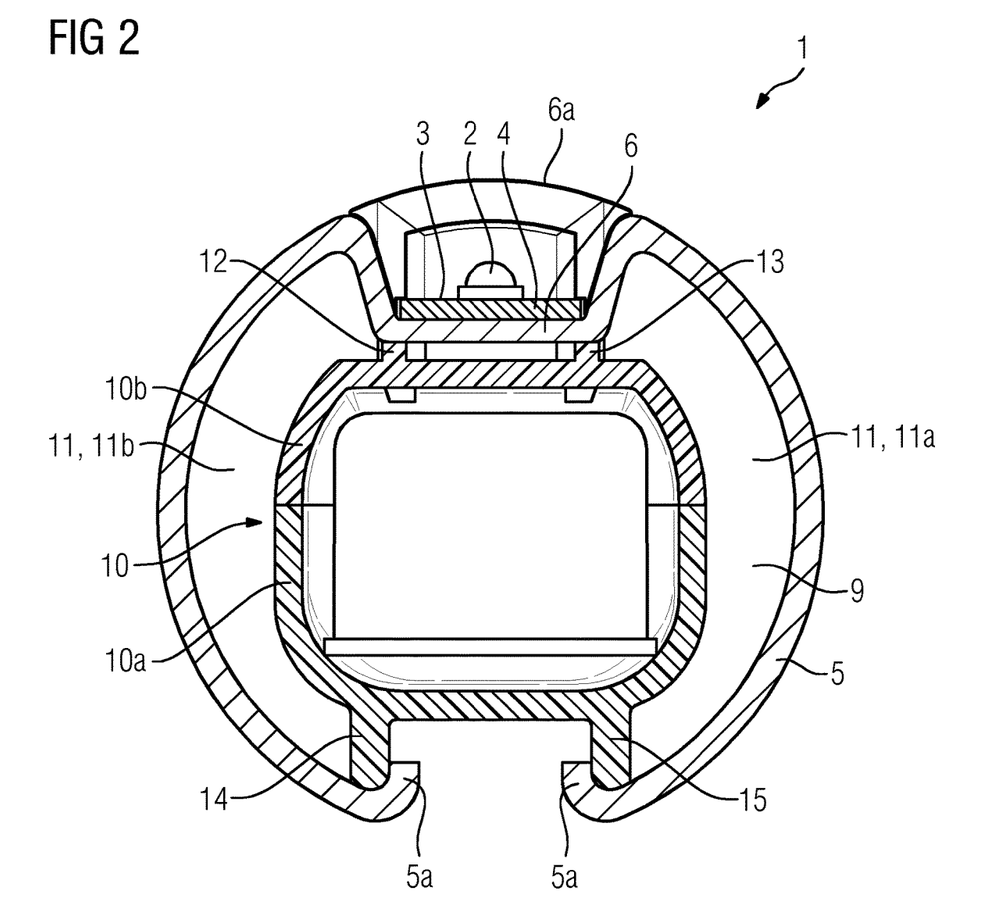
FIG. 2 illustrates the LED retrofit festoon bulb in accordance with the first embodiment as a sectional view as seen from the front.

As is also illustrated in FIG. 2, the tubular cooling body 5 includes in the cross section an annular sector-shaped base form that is open on the lower face, wherein the support surface 6 is provided in a region of an upper face annular point or apex. The support surface 6 includes on an end side 7 a receiving recess 8. Moreover, the free ends of the cooling body 5 are embodied in the cross section as inwardly curved ends 5a. The cooling body 5 is a bent sheet metal part or a metal extrusion molded part for the purpose of achieving a simple and cost-effective production process. The cooling body 5 may by way of example be embodied from aluminum or steel.

An elongated multi-part driver housing 10 embodied from an electrically insulating synthetic material is introduced into a hollow space 9 of the cooling body 5. The driver housing 10 includes in this case in particular a lower part 10a and an upper part 10b. The driver housing 10 includes a longer length than the cooling body 5 and protrudes out at the two end sides 7 of the cooling body 5. The driver housing 10 includes a base form that has a rectangular cross section or profile. Two essentially mirror-symmetrically arranged part flow channels 11a, 11b are provided between the driver housing 10 and the cooling body 5, said channels are connected one to the other and may also be regarded as a single flow channel 11. The flow channel 11 or rather the part flow channels 11a and 11b are formed by a large part of the inner surface of the cooling body 5 so that the cooling body 5 includes a large inner heat transmitting surface or cooling surface. The flow channel 11 renders it possible to achieve a particularly effective (cooling) air flow in the longitudinal extension or rather along a longitudinal axis L of the LED retrofit festoon bulb 1.

The large cooling surface is achieved by virtue of the fact that the driver housing 10 is held in a press fit manner by the cooling body 5 by way of connecting pieces 12, 13, 14, 15 that include a small cross section in the flow direction. By virtue of the small cross section, a high quality thermal decoupling between the cooling body 5 and the driver housing 10 is also achieved. The connecting pieces 12 to 15 lie in each case at connecting piece sections 12 to 15 that are arranged in a row in the longitudinal direction. Whereas the connecting pieces 12 and 13 (or rather the associated connecting piece sections) are arranged on an upper face of the upper part 10b of the driver housing 10 and from there protrude perpendicularly upwards, the connecting pieces 14 and 15 (or rather the associated connecting piece sections) are arranged on a lower face of the lower part 10a of the driver housing 10 and from there protrude perpendicularly downwards. In particular, the tips of the connecting pieces 12 and 13 contact a lower face of the support surface 6 that is protruding into the hollow space 9 and the tips of the connecting pieces 14 and 15 engage from the inside into the inwardly curved free ends 5a of the cooling body. As a consequence, although it is possible to draw the cooling body 5 in an elastic manner in the direction of the connecting pieces 12 to 15 for the purpose of producing the press fit, said cooling body cannot bend to the side, which produces a greater magnitude of stability.

The regions of the driver housing 10 protruding beyond the cooling body 5 are embodied as a base of the R7 type. Connecting elements 17 that are R7s-compatible are provided in each case on the end sides 16 of the driver housing 10. The connecting elements are used for mechanically holding the semiconductor retrofit bulb 1 in an R7s-compatible bulb holder and also for providing the electrical contact. The connecting elements 17 are therefore arranged outside the cooling body 5 and consequently protrude entirely beyond the cooling body 5.

Figure 3:
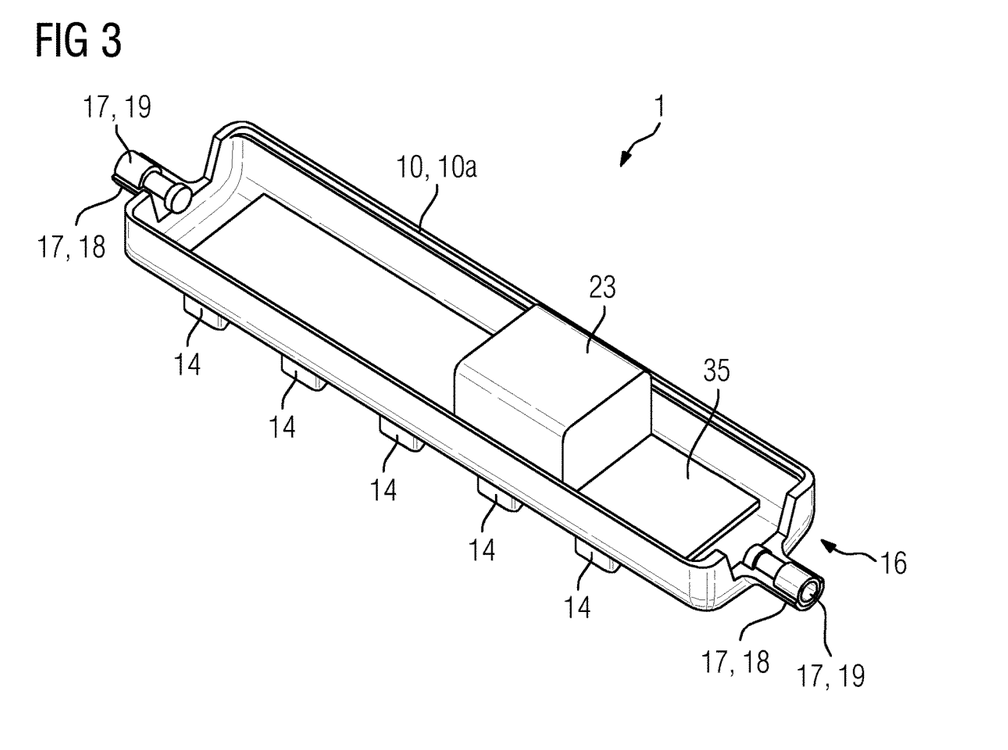
FIG. 3 illustrates an oblique view from above of a lower part of a driver housing.

FIG. 3 illustrates an oblique view from above of the trough-shaped lower part 10*a* of the multi-part driver housing 10, by way of example during a production step for the purpose of producing the semiconductor retrofit bulb 1. A driver 23 (that is attached to the carrier 35, in particular a circuit board) is inserted in the lower part 10*a* and said driver is used for the purpose of converting electrical signals, which are received by way of the connecting elements 17, into electrical signals that are suitable for operating the light diodes 2.

Figure 4:
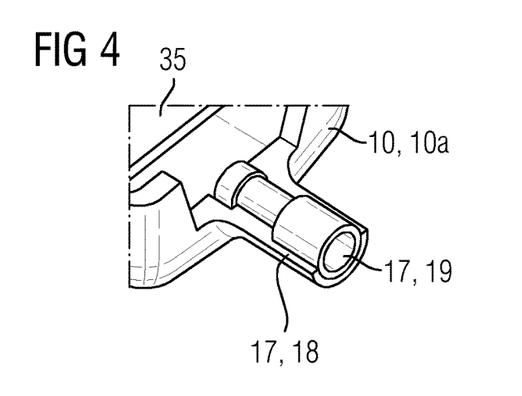
FIG. 4 illustrates an enlarged section of the lower part shown in FIG. 3 in the region of an end side.

As is also illustrated in an enlarged view in FIG. 4, the connecting elements 17 are embodied as tubular, end-face protrusions 18 that are designed on the inner face in the form of a metal tube 19 as a contact element. In order to produce the semiconductor retrofit bulb 1, the metal tube 19 is initially inserted in a half protrusion 18 that is associated with the lower part 10*a*. The outer contour of the metal tube 19 and the inner contour of the protrusion 18 are shaped in such a manner that the metal tube 19 is received in the protrusion 18 in the longitudinal direction in a positive fitting manner.

As a consequence, the upper part 10*b* may be placed or covered, for example in a clamping manner, on the lower part 10*a* loosely, in other words without further fastening means. The metal tubes 19 and where appropriate also the driver 23 are then inserted between the lower part 10*a* and the upper part 10*b* in a press fit manner.

Figure 5:
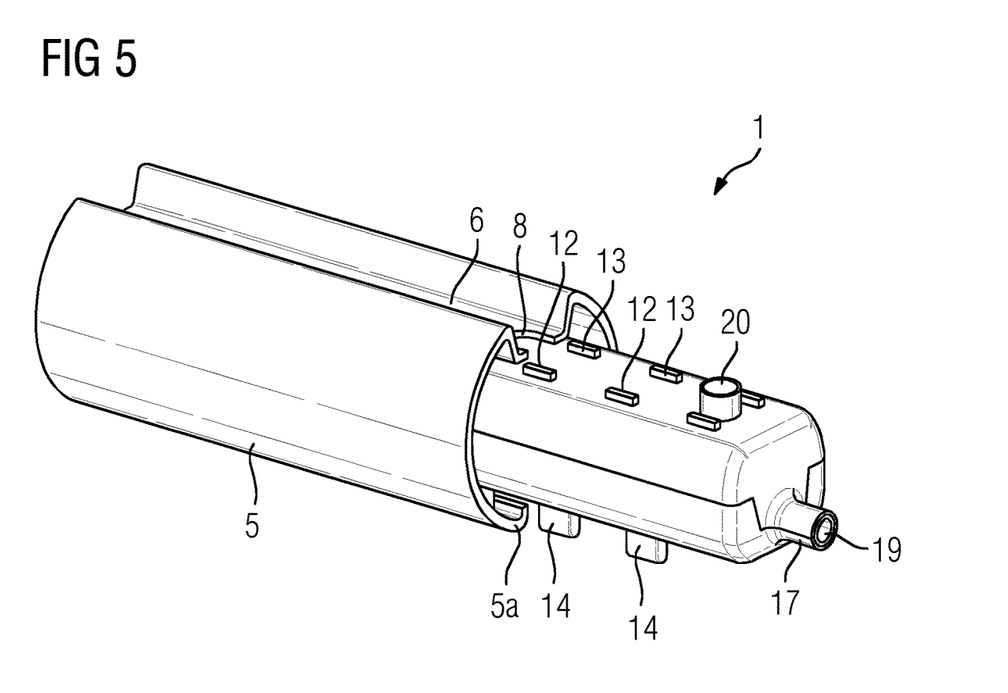
FIG. 5 illustrates an oblique view from above of a production step for producing the LED retrofit festoon bulb in accordance with the first embodiment, wherein a driver housing is partially inserted in a cooling body.

FIG. 5 illustrates in an oblique view from above a production step for producing the LED retrofit festoon lamp 1, wherein the loosely assembled or covered driver housing 10 is already partially inserted into the cooling body 5 by means of the insertion process. The driver housing 10 is already sufficiently held together by means of a press-fit arrangement of the cooling body 5.

The driver housing 10 is inserted in one direction into the cooling body 5, wherein a cable duct 20 that protrudes in a perpendicular manner upwards from the upper part and is arranged on an end region abuts against the receiving recess 8 and is received in said recess. It is thus possible to achieve a precise positioning of the driver housing 10 relative to the cooling body 5. It is possible to guide at least one electric line (not illustrated) through the cable duct 20 from the driver 23 to the light diodes 2.

Figure 6:
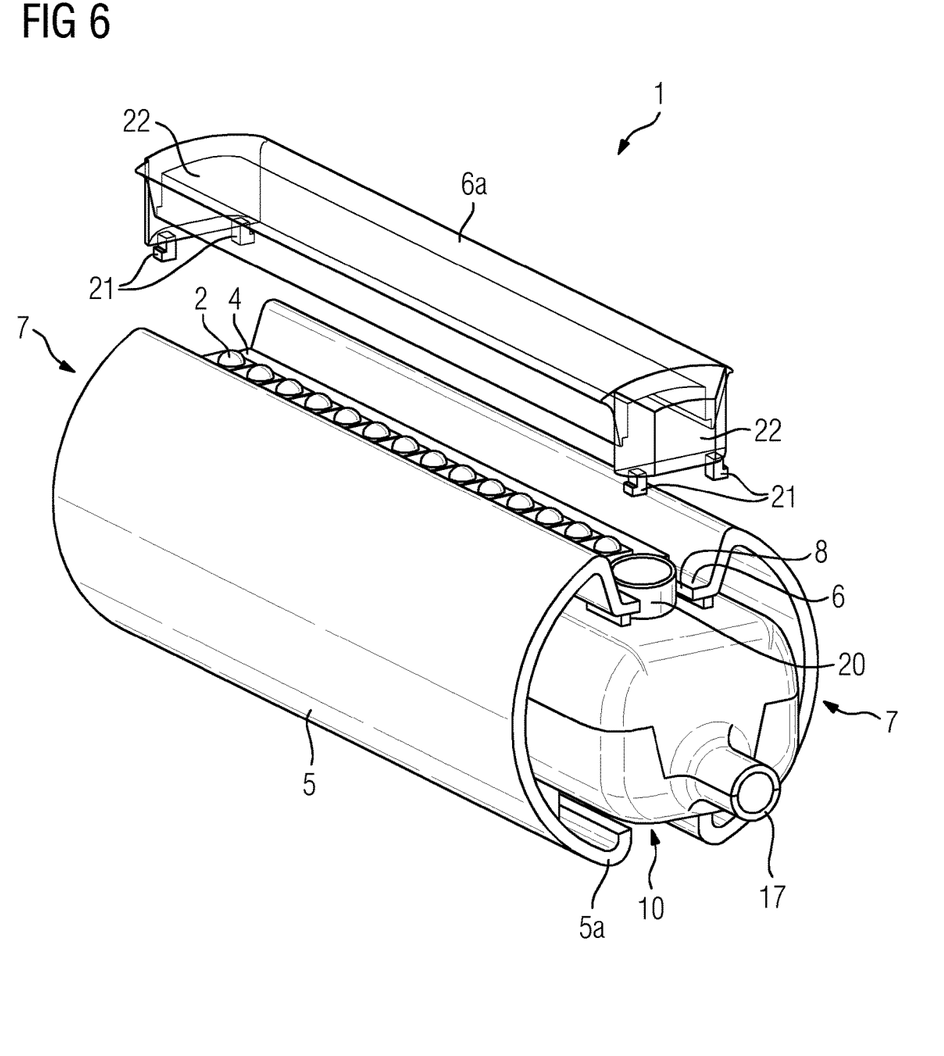
FIG. 6 illustrates an oblique view from above of a further, subsequent production step for producing the LED retrofit festoon bulb in accordance with the first embodiment, wherein a diffusor is moved into position for placing on the cooling body.

FIG. 6 illustrates an oblique view from above of a further, subsequent production step for producing the LED retrofit festoon lamp 1, wherein the diffusor 6*a* is moved into place for the purpose of placing on the cooling body 5. The cooling body 5 is already equipped with the LED strip 2, 4. The diffusor 6*a* includes on its lower face four latching or snap hooks 21 in order for it to be connected in a latching manner to the cooling body 5.

Figure 7:
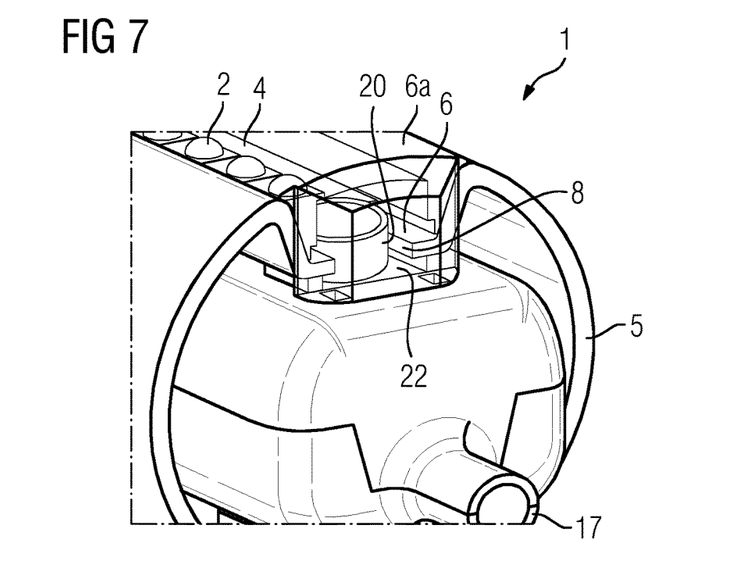
FIG. 7 illustrates an oblique view from above of an end side section of the finished LED retrofit festoon bulb in accordance with the first embodiment in the region of the diffusor.

As is illustrated in an enlarged view in FIG. 7, the latched-on diffusor 6*a* pushes the carrier 4 onto the support surface 6 of the cooling body 5, as a consequence of which inter alia the transfer of heat between the carrier 4 and the cooling body 5 is improved and the arrangement of fixing the carrier 4 is enhanced. In addition, the cable duct 20 is held in the receiving recess 8 by means of a downwards extended end side 22 of the diffusor 6*a* and the driver housing 10 is thus prevented from being displaced or even separated from the cooling body 5.

Figure 8:
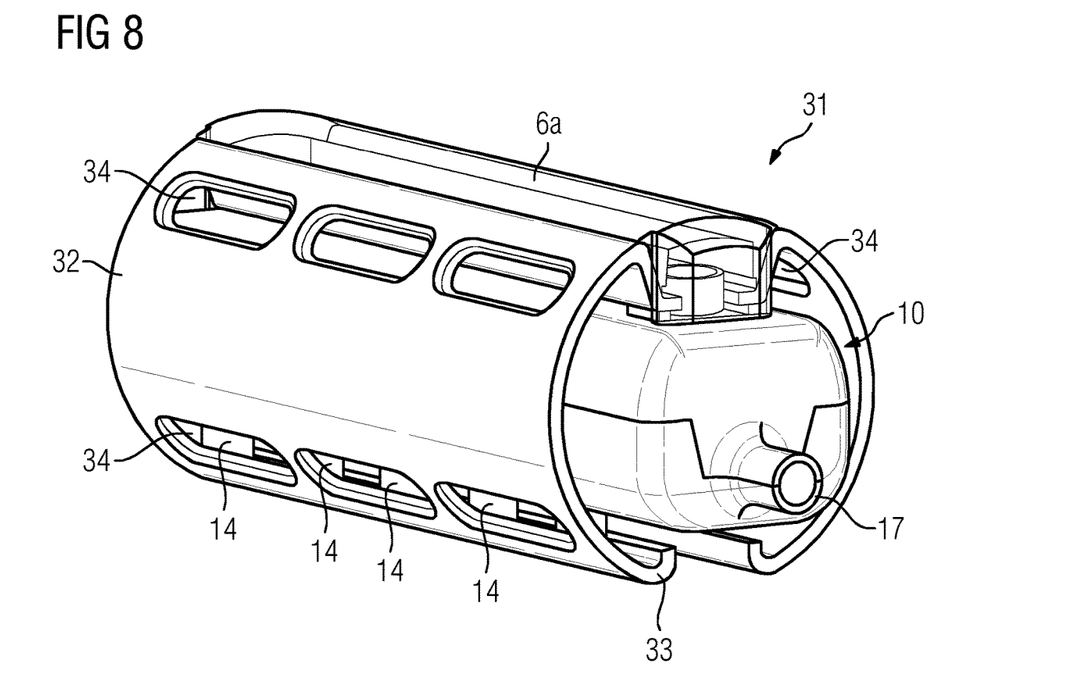
FIG. 8 illustrates in an oblique view from above of an LED retrofit festoon bulb in accordance with a second embodiment.

FIG. 8 illustrates an oblique view from above of an LED retrofit festoon bulb 31 in accordance with a second embodiment. The retrofit festoon bulb 31 is embodied in a similar manner to the LED retrofit festoon bulb 1; however, it includes cut-outs in the form of cooling slots 34 in a peripheral surface 32 of the cooling body 33 for the purpose of improving the transverse through-flow.

Thus, it is possible in lieu of the diffusor also to use a clear or transparent cover that, where appropriate, may include an optical characteristic, for example for beam guidance, in particular for imaging.

The diffusor 6*a* may also be latched to the upper part 10*b* of the driver housing 10.

The diffusor 6*a* inter alia may moreover protrude at least in the region of the cable duct 20 beyond the cooling body 5 and also cover the cable duct 20. Thus, it is possible to forego the receiving recess 8 since an end surface of the diffusor 6*a* may be used as a stop for the cable duct 20.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A semiconductor retrofit bulb having connecting elements that are arranged on two sides, the semiconductor retrofit bulb comprising:
   a tubular cooling body having at least one outer face support surface, wherein there is arranged on the support surface at least one semiconductor light source; and
   a driver housing that is introduced into a hollow space of the cooling body such that the driver housing is radially within an annulus defined by the cooling body,
   wherein at least one flow channel is provided between the driver housing and the cooling body, the at least one flow channel being fluidly communicable with air outside of the semiconductor retrofit bulb,
   wherein the driver housing comprises, at end sides thereof, the connecting elements that protrude at least in part axially outside of the cooling body, and
   the connecting elements encase a contact element, wherein each part of the connecting elements is formed integrally with a part of the driver housing, and the part of the driver housing is surrounded by the cooling body.

2. The semiconductor retrofit bulb as claimed in claim 1, wherein the driver housing is held in a press fit manner by the cooling body by way of connecting pieces.

3. The semiconductor retrofit bulb as claimed in claim 2, wherein the driver housing comprises multiple parts and is held together by means of the press fit manner.

4. The semiconductor retrofit bulb as claimed in claim 3, wherein at least one of the connecting elements comprises an electrically conductive contact element, that is inserted between two parts of the driver housing.

5. The semiconductor retrofit bulb as claimed in claim 2, wherein the cooling body comprises an open circular profile having inwardly curved free ends and at least some of the connecting pieces engage in the inwardly curved free ends.

6. The semiconductor retrofit bulb as claimed in claim 1, wherein the driver housing is inserted into the cooling body.

7. The semiconductor retrofit bulb as claimed in claim 1, wherein the driver housing comprises a base form that has a rectangular profile.

8. The semiconductor retrofit bulb as claimed in claim 1, wherein the cooling body comprises, at an end side, a receiving recess configured to introduce a cable duct that protrudes from the driver housing.

9. The semiconductor retrofit bulb as claimed in claim 1, wherein the support surface comprises a strip-shaped base form and is equipped with semiconductor light sources that are arranged in a row.

10. The semiconductor retrofit bulb as claimed in claim 1, wherein the support surface is covered by a diffusor.

11. The semiconductor retrofit bulb as claimed in claim 10,
wherein a carrier that is equipped with at least one semiconductor light source lies on the support surface and the diffusor pushes the carrier onto the support surface.

12. The semiconductor retrofit bulb as claimed in claim 1, wherein the cooling body is a bent sheet metal part or a metal extrusion molded part.

13. The semiconductor retrofit bulb as claimed in claim 1, wherein the semiconductor retrofit bulb is a retrofit festoon bulb.

14. The semiconductor retrofit bulb as claimed in claim 1, wherein the driver housing includes:
an upper part of the driver housing; and
a lower part of the driver housing, and
the upper part of the driver housing and the lower part of the driver housing protrude at least in part axially outside of the cooling body.

15. A method for producing a semiconductor retrofit bulb, the method comprising:
providing a tubular cooling body that is equipped with at least with one semiconductor light source; and
inserting a driver housing, at end sides thereof, connecting elements, into a hollow space of the cooling body such that the driver housing in radially within an annulus defined by the cooling body, the connecting elements protruding at least in part axially outside of the cooling body, said cooling body holding the driver housing in a press fit manner so that at least one flow channel is provided between the driver housing and the cooling body, the at least one flow channel being fluidly communicable with air outside of the semiconductor retrofit bulb, wherein the connecting elements encase a contact element, wherein each part of the connecting elements is formed integrally with a part of the driver housing, and the part of the driver housing is surrounded by the cooling body.

16. The method as claimed in claim 15,
wherein the driver housing comprises multiple parts and prior to said inserting the driver housing the following are performed:
inserting a driver into one part of the driver housing; and
loosely covering the one part of the driver housing with another part of the driver housing; and
said inserting the driver housing comprises:
inserting the loosely covered driver housing into the hollow space of the cooling body, said cooling body holding the driver housing in a press fit manner.

17. A semiconductor retrofit bulb, comprising:
a tubular cooling body with an outer face, wherein the outer face comprises a support surface onto which a semiconductor light source is arranged; and
a driver housing arranged in a hollow space of the tubular cooling body such that the driver housing is radially within an annulus defined by the cooling body,
wherein the driver housing comprises a first part and at least one second part,
where in the driver housing comprises, at end sides thereof, connecting elements that protrude outside of the cooling body in an axial direction, and
wherein the connecting elements encase a contact element, wherein each part of the connecting elements is formed integrally with a part of the driver housing, and the part of the driver housing is surrounded by the cooling body.

18. The semiconductor retrofit bulb according to claim 17,
wherein the driver housing comprises connecting pieces that extend along a radial direction,
wherein the cooling body comprises inwardly curved free ends, and
wherein at least some of the connecting pieces engage in the inwardly curved free ends.

19. The semiconductor retrofit bulb according to claim 17,
wherein the semiconductor light source is housed in a recess in the cooling body such that the cooling body frames the semiconductor light source on two sides thereof.

* * * * *